US012656201B2

(12) United States Patent
Boettinger

(10) Patent No.: US 12,656,201 B2
(45) Date of Patent: Jun. 16, 2026

(54) MICROELECTROMECHANICAL PRESSURE SENSOR

(71) Applicant: Robert Bosch GmbH, Stuttgart (DE)

(72) Inventor: Jonas Boettinger, Wannweil (DE)

(73) Assignee: ROBERT BOSCH GMBH, Stuttgart (DE)

( * ) Notice: Subject to any disclaimer, the term of this patent is extended or adjusted under 35 U.S.C. 154(b) by 342 days.

(21) Appl. No.: 18/422,962

(22) Filed: Jan. 25, 2024

(65) Prior Publication Data

US 2024/0264023 A1 Aug. 8, 2024

(30) Foreign Application Priority Data

Feb. 6, 2023 (DE) ...................... 10 2023 200 938.2

(51) Int. Cl.
| | |
|---|---|
| *G01L 19/06* | (2006.01) |
| *G01L 1/14* | (2006.01) |
| *G01L 1/22* | (2006.01) |
| *G01L 1/26* | (2006.01) |
| *G01L 9/00* | (2006.01) |
| *G01L 9/04* | (2006.01) |

(Continued)

(52) U.S. Cl.
CPC .......... *G01L 19/0645* (2013.01); *G01L 1/142* (2013.01); *G01L 1/22* (2013.01); *G01L 1/26* (2013.01); *G01L 9/0051* (2013.01); *G01L 9/0072* (2013.01); *G01L 9/04* (2013.01); *G01L 9/12* (2013.01); *G01L 19/00* (2013.01); *G01L 25/00* (2013.01); *G01L 27/005* (2013.01)

(58) Field of Classification Search
CPC ....... G01L 19/0645; G01L 1/142; G01L 1/22; G01L 1/26; G01L 9/0051; G01L 9/0072; G01L 9/04; G01L 9/12; G01L 19/00; G01L 25/00; G01L 27/005
See application file for complete search history.

(56) References Cited

U.S. PATENT DOCUMENTS

2009/0160462 A1 6/2009 Harish
2014/0055974 A1* 2/2014 Hansen .................. H05K 1/144
                                              361/804

(Continued)

FOREIGN PATENT DOCUMENTS

DE 102012112971 A1 7/2014
DE 102017211444 A1 1/2019

(Continued)

*Primary Examiner* — Ryan D Walsh
(74) *Attorney, Agent, or Firm* — NORTON ROSE FULBRIGHT US LLP

(57) ABSTRACT

A microelectromechanical pressure sensor having a housing unit, a base structure, a pressure sensor element, and a deflection measuring element. The housing unit defines a receiving space. The base structure, the pressure sensor element, and the deflection measuring element are arranged in the receiving space. The receiving space is filled with a protective medium which covers the pressure sensor element. The pressure sensor element is arranged so as to be deflectable relative to the base structure. The deflection measuring element is configured to determine a relative deflection of the pressure sensor element relative to the base structure. A method for correcting pressure measurement values of a microelectromechanical pressure sensor is also described.

14 Claims, 3 Drawing Sheets

Figure 1:
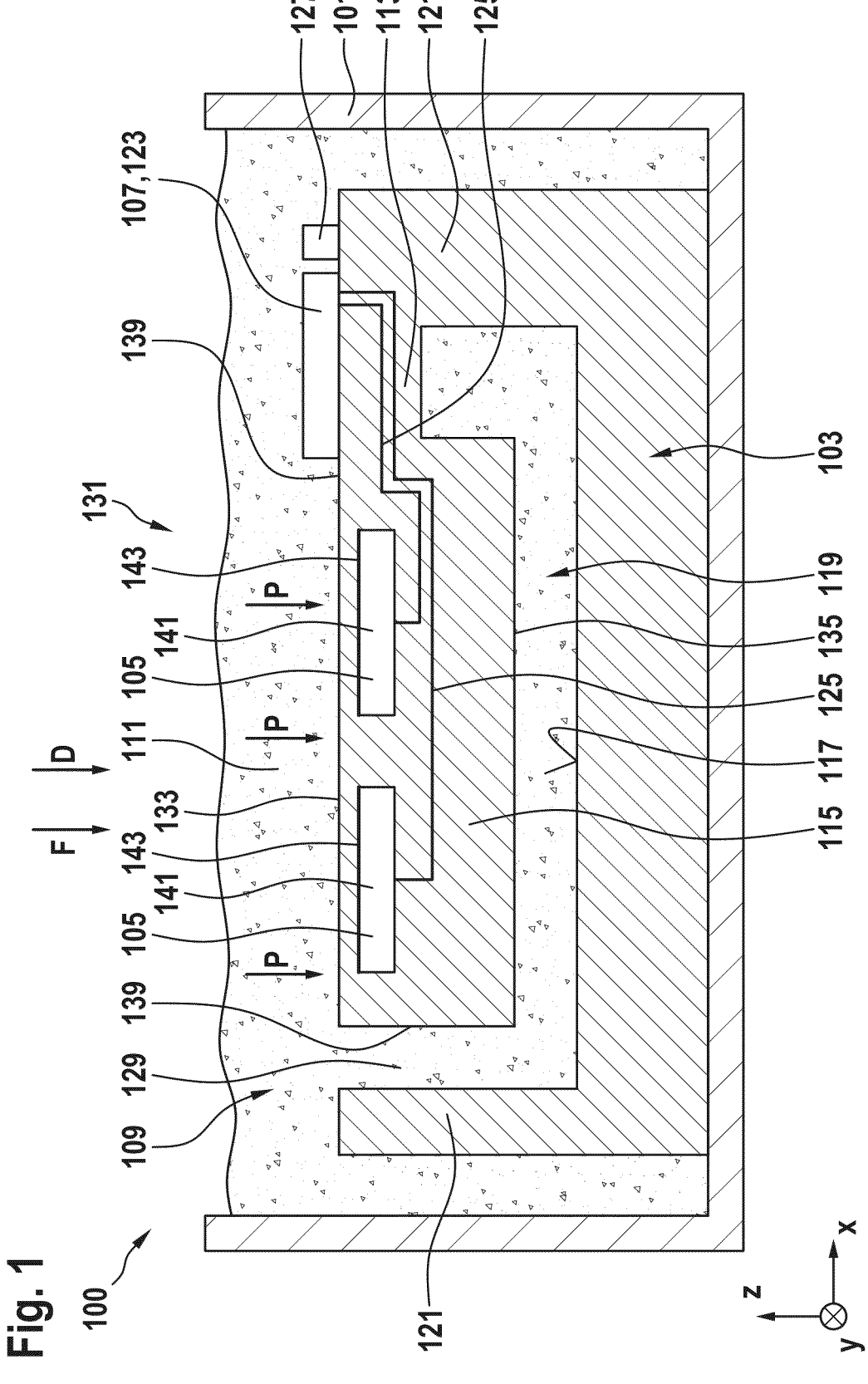

(51) Int. Cl.
    G01L 9/12           (2006.01)
    G01L 19/00         (2006.01)
    G01L 25/00         (2006.01)
    G01L 27/00         (2006.01)

(56) References Cited

U.S. PATENT DOCUMENTS

| | | | |
|---|---|---|---|
| 2014/0077816 A1* | 3/2014 | Bruendel | G01R 31/382 |
| | | | 324/426 |
| 2018/0136066 A1* | 5/2018 | Wagner | G01L 13/026 |
| 2020/0200634 A1* | 6/2020 | Schiller | G01L 19/0645 |
| 2020/0283286 A1 | 9/2020 | Meinhold et al. | |

FOREIGN PATENT DOCUMENTS

| | | | |
|---|---|---|---|
| EP | 2423656 A1 | 2/2012 |
| JP | H0918017 A | 1/1997 |

* cited by examiner

200

| record pressure measurement values | — 201 |
| record deflection values | — 203 |
| ascertain pressure value | — 205 |
| correct pressure measurement values | — 207 |
| output corrected pressure measurement value | — 209 | storage medium computer program product — 300

— 301

**MICROELECTROMECHANICAL PRESSURE
SENSOR**

CROSS REFERENCE

The present application claims the benefit under 35
U.S.C. § 119 of German Patent Application No. DE 10 2023
200 938.2 filed on Feb. 6, 2023, which is expressly incor-
porated herein by reference in its entirety.

FIELD

The present invention relates to a microelectromechanical
pressure sensor and to a method for correcting pressure
values of a microelectromechanical pressure sensor.

BACKGROUND INFORMATION

Pressure sensors are cast with protective media in order to
protect the MEMS membrane from liquids and particles.
However, the weight of the protective media used can lead
to measurement deviations of the sensors.

SUMMARY

It is an object of the present invention to provide an
improved microelectromechanical pressure sensor and an
improved method for correcting measurement values of a
microelectromechanical pressure sensor.

The object may be achieved by the pressure sensor and the
method having features of the present invention. Advanta-
geous embodiments of the present invention are disclosed
herein.

According to one aspect of the present invention, a
microelectromechanical pressure sensor having a housing
unit, a base structure, a pressure sensor element, and a
deflection measuring element is provided, wherein the hous-
ing unit defines a receiving space, wherein the base struc-
ture, the pressure sensor element, and the deflection mea-
suring element are arranged in the receiving space, wherein
the receiving space is filled with a protective medium which
covers the pressure sensor element, wherein the pressure
sensor element is arranged so as to be deflectable relative to
the base structure, and wherein the deflection measuring
element is configured to determine a relative deflection of
the pressure sensor element relative to the base structure.

This can achieve the technical advantage that an improved
microelectromechanical pressure sensor can be provided.
According to an example embodiment of the present inven-
tion, the pressure sensor comprises a housing unit, in which
a base structure with a pressure sensor element and a
deflection measuring element are arranged. For this purpose,
the housing unit defines a receiving space. The receiving
space is filled with a protective medium, which covers the
pressure sensor element and thus protects it from environ-
mental influences. However, the protective medium has a
mass that depends on the quantity and design of the respec-
tive protective medium. Depending on the position of the
pressure sensor, the protective medium exerts pressure on
the pressure sensor element due to the mass of the protective
medium. This pressure of the protective medium can distort
the pressure measurement values of the pressure sensor
element and thereby contribute to incorrect pressure mea-
surements. However, since the pressure sensor element in
the pressure sensor according to the present invention is
arranged in the receiving space so as to be deflectable
relative to the base structure, the pressure sensor element can be deflected relative to the base structure by the pressure
exerted on the pressure sensor element by the protective
medium. By measuring the relative deflection of the pres-
sure sensor element relative to the base structure by means
of the deflection measuring element, the effect of the pres-
sure exerted on the pressure sensor element by the protective
medium can thus be ascertained and the pressure measure-
ment values of the pressure sensor element can be corrected
accordingly. In this case, the deflection measuring element
can be calibrated to known pressures so that corresponding
pressure values exerted on the pressure sensor element can
be ascertained on the basis of the measured relative deflec-
tion of the pressure sensor element relative to the base
structure. As a result, a precise correction of the pressure
measurement values of the pressure sensor element can be
brought about and the disturbing influences of the protective
medium which covers the pressure sensor element can be
corrected. Depending on the position of the microelectro-
mechanical pressure sensor relative to Earth's gravitational
force, the protective medium which covers the pressure
sensor element exerts different pressures on the pressure
sensor element.

According to one example embodiment of the present
invention, the pressure sensor element is resiliently con-
nected to the base structure via a suspension element.

This can achieve the technical advantage that, via the
suspension element, the pressure sensor element is secured
and nevertheless arranged in the receiving space of the
housing unit so as to be deflectable relative to the base
structure.

According to one example embodiment of the present
invention, the sensor element is arranged on a decoupling
plate.

This can achieve the technical advantage that, via the
decoupling plate, the pressure sensor element is arranged in
a secured manner in the receiving space. The pressure sensor
element is thus fixed to the decoupling plate in a secured
manner. However, the latter is largely decoupled from the
base structure so that vibrations or stresses cannot be trans-
mitted from the base structure to the decoupling plate.

According to one example embodiment of the present
invention, the decoupling plate is aligned in parallel with a
bottom surface of the base structure and spaced apart from
the bottom surface.

This can achieve the technical advantage that a precise
deflection of the pressure sensor element relative to the base
structure can be ascertained as a result of the parallel
arrangement of the decoupling plate relative to the bottom
surface of the base structure. During the deflection of the
pressure sensor element relative to the base structure, a
deflection of the decoupling plate relative to the base struc-
ture likewise takes place as a result of the fixing of the
pressure sensor element to the decoupling plate.

According to one example embodiment of the present
invention, an intermediate space between the decoupling
plate and the bottom surface is filled with the protective
medium.

This can achieve the technical advantage that, by filling
the intermediate space between the decoupling plate and the
bottom surface of the base structure with the protective
medium, reliable and repeatable determination of the pres-
sure exerted on the pressure sensor element by the protective
medium is made possible on the basis of the deflection of the
pressure sensor element relative to the base structure. Since
the intermediate space is completely filled by the protective
medium and does not comprise any air regions, identical
pressures exerted on the pressure sensor element lead to identical deflection values. This enables precise determination of the pressure values exerted on the pressure sensor element by the protective medium.

According to one example embodiment of the present invention, the decoupling plate is resiliently integrally connected to a wall element of the base structure via the suspension element.

This can achieve the technical advantage that the pressure sensor element is connected to the base structure via the decoupling plate in a secured manner so as to be deflectable.

According to one example embodiment of the present invention, the deflection measuring element comprises at least one strain gauge which is formed on the suspension element.

This can achieve a technical advantage that a precise and robust measurement of the deflection of the pressure sensor element relative to the base structure is made possible via the strain gauge which is formed on the suspension element. During a deflection of the pressure sensor element relative to the base structure, during which a deflection of the decoupling plate relative to the base structure likewise takes place, a deformation of the suspension element via which the decoupling plate is resiliently connected to the base structure is brought about. The deformation of the suspension element also brings about a deformation of the strain gauge, as a result of which the deformation of the suspension element and the associated deflection of the decoupling plate and of the pressure sensor element fixed thereto, relative to the base structure can be measured. The strain gauge thus allows a technically simple and robust measurement of the deflection of the pressure sensor element relative to the base structure.

According to one example embodiment of the present invention, the strain gauge is designed as a capacitive strain gauge.

This can achieve the technical advantage that a precise and robust measurement of the deflection of the pressure sensor element relative to the base structure is made possible.

According to one example embodiment of the present invention, the strain gauge is designed as a resistive strain gauge.

This can achieve the technical advantage that a precise and robust measurement of the deflection of the pressure sensor element relative to the base structure is made possible.

According to one example embodiment of the present invention, the protective medium is made of a gel material.

This can achieve the technical advantage that a resistive protective medium can be provided.

According to one example embodiment of the present invention, the pressure sensor element is designed as a capacitive pressure sensor element.

This can achieve the technical advantage that a precise and robust pressure sensor element can be provided.

According to a further aspect of the present invention, a method for correcting pressure measurement values of a microelectromechanical pressure sensor according to one of the preceding embodiments of the present invention is provided, comprising:

recording at least one pressure measurement value of the pressure sensor element;

recording at least one deflection value of the deflection measuring element, wherein the deflection value describes a deflection of the pressure sensor element relative to the base structure;

ascertaining, on the basis of the deflection value, a pressure value which acts on the pressure sensor element as a result of the protective medium;

correcting the pressure measurement value measured by the pressure sensor element by the ascertained pressure value which acts on the pressure sensor element as a result of the protective medium; and outputting a corrected pressure measurement value.

This can achieve the technical advantage that an improved method for correcting pressure measurement values of a microelectromechanical pressure sensor can be provided. For this purpose, pressure measurement values of the pressure sensor element are recorded first. Furthermore recorded are deflection values of the deflection measuring element, which describe the relative deflection of the pressure sensor element relative to the base structure. On the basis thereof, a pressure value exerted on the pressure sensor element by the protective medium is ascertained. The pressure measurement values of the pressure sensor element are subsequently corrected to the respective pressure value exerted on the pressure sensor element by the protective medium, and a correspondingly corrected pressure measurement value is provided. This enables a precise correction of the pressure measurement values of the pressure sensor element with respect to the pressure exerted on the pressure sensor element by the protective medium which covers the pressure sensor element.

According to one aspect of the present invention, a computing unit is provided, which is configured to perform the method for correcting pressure measurement values of a microelectromechanical pressure sensor.

According to one aspect of the present invention, a computer program product is provided, comprising instructions that, when the program is executed by a data processing unit, cause this data processing unit to perform the method for correcting pressure measurement values of a microelectromechanical pressure sensor.

Example embodiments of the present invention are described with reference to the figures.

Figure 2:
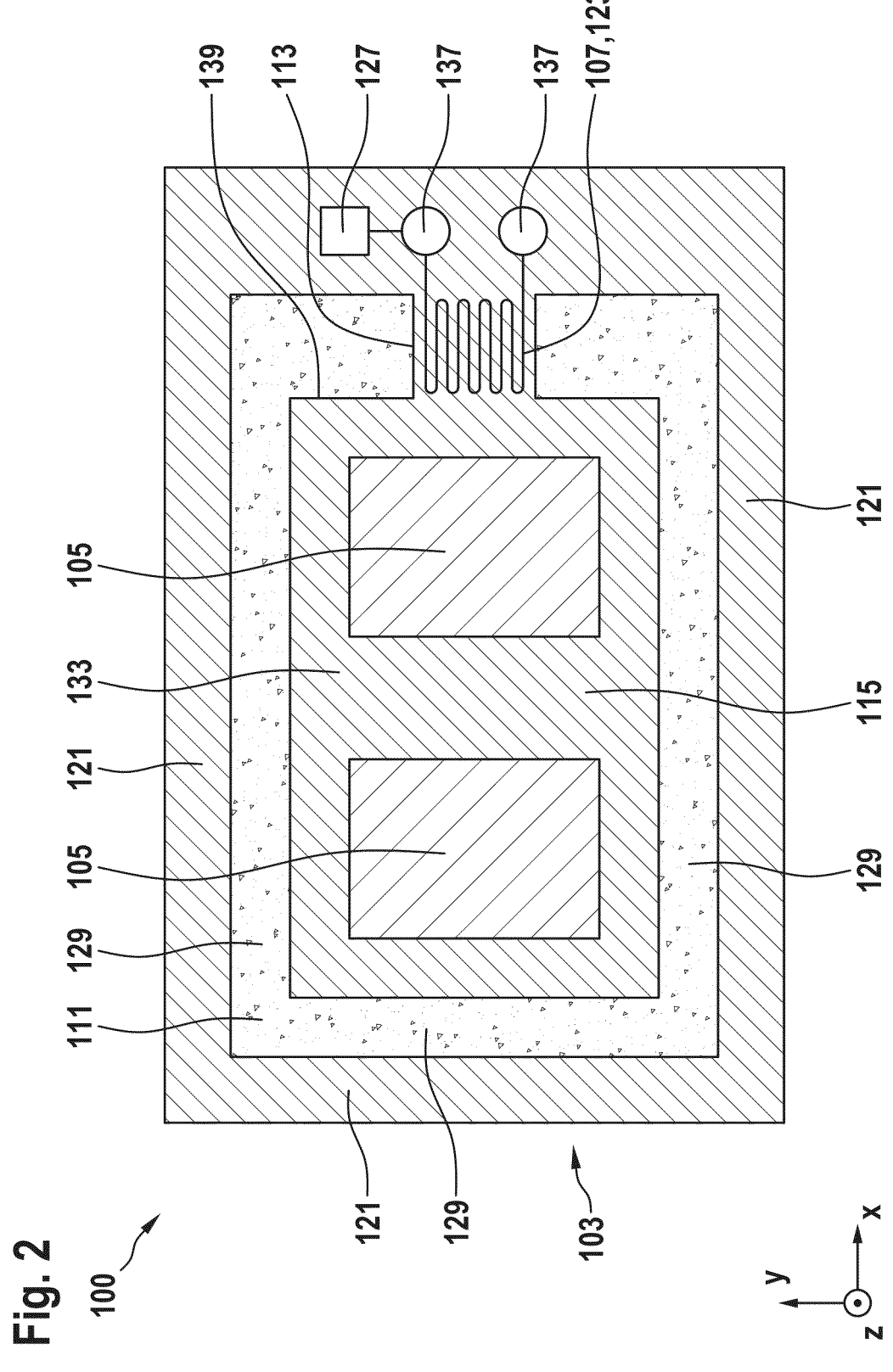
Figure 3:
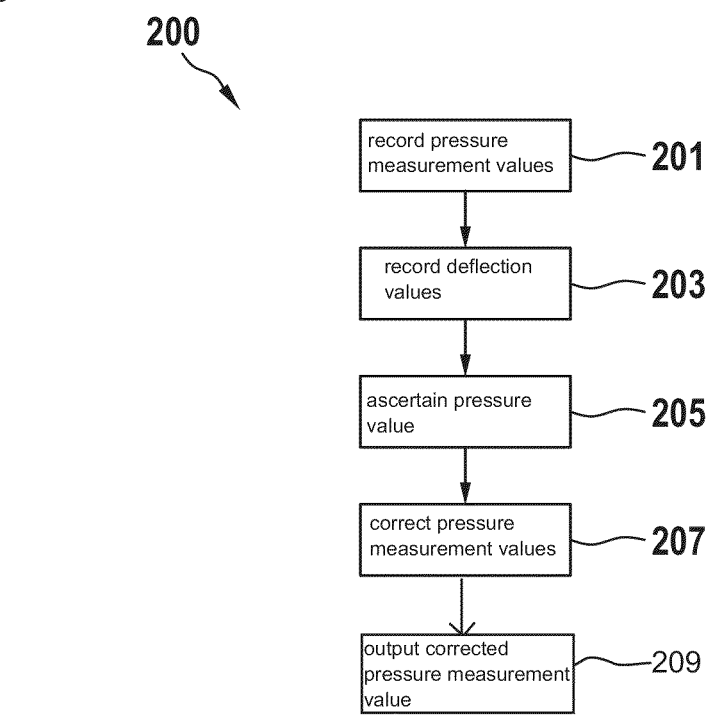
Figure 4:
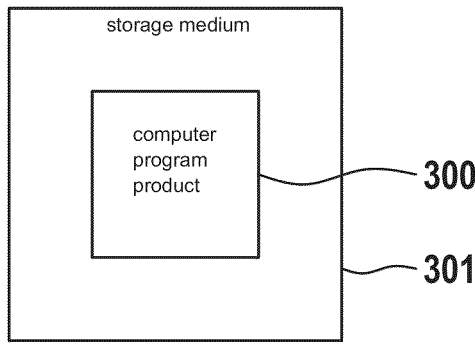

FIG. 1 a schematic sectional side view of a micromechanical pressure sensor according to one embodiment;

FIG. 2 a schematic plan view of the micromechanical pressure sensor according to one embodiment;

FIG. 3 a flowchart of a method for correcting pressure measurement values of a micromechanical pressure sensor according to one embodiment; and FIG. 4 a schematic representation of a computer program product.

DETAILED DESCRIPTION OF EXAMPLE EMBODIMENTS

FIG. 1 shows a schematic sectional side view of a micromechanical pressure sensor 100 according to one embodiment.

In the embodiment shown, the microelectromechanical pressure sensor 100 comprises a housing unit 101. The housing unit 101 defines a receiving space 109. A base structure 103, a pressure sensor element 105, and a deflection measuring element 107 are arranged in the receiving space 109. Furthermore, the receiving space 109 is filled with a protective medium 111.

In the sectional representation shown, the base structure 103 has a bottom surface 117 and wall elements 121 delimiting the bottom surface 117.

In the embodiment shown, the microelectromechanical pressure sensor 100 has two pressure sensor elements 105.

The pressure sensor elements 105 each have a measurement cavity 141 and a measurement membrane 143. The pressure sensor elements 105 are arranged on a decoupling plate 115. The decoupling plate 115 is resiliently arranged on one of the wall elements 121 of the base structure 103 via a suspension element 113. As a result of the resilient suspension element 113, the pressure sensor elements 105 are arranged in the receiving space 109 so as to be deflectable relative to the base structure 103.

In the embodiment shown, the deflection measuring element 107 is arranged on the suspension element 113. Furthermore, a computing unit 127 is formed on the wall element 121.

The pressure sensor elements 105 are connected to the computing unit 127 via bonding wires 125.

In the embodiment shown, the decoupling plate 115 is arranged in parallel with the bottom surface 117 of the base structure 103.

The decoupling plate 115 is spaced apart from the bottom surface 117 and thus defines an intermediate space 119 between an underside 135 of the decoupling plate 115 and the bottom surface 117. In the embodiment shown, the intermediate space 119 is likewise completely filled by the protective medium 111.

In the embodiment shown, the decoupling plate 115 is fixed to a wall element 121 of the base structure 103 only via a suspension element 113. The suspension element 113 is in this case fixed to a side region 139 of the suspension plate.

In the representation shown, the decoupling plate 115 is shown in a neutral, i.e., non-deflected, position relative to the base structure 103.

A further intermediate space 129 between the decoupling plate 115 and the opposite wall element 121 of the base structure 103 is formed on an opposite side region 139 of the decoupling plate 115.

Via the suspension element 113, the decoupling plate 115 and the pressure sensor element 105 installed thereon can be deflected relative to the base structure 103 and in particular relative to the bottom surface 117.

In the embodiment shown, an entire upper side 133 of the decoupling plate 115 and the measurement membranes 143 of the pressure sensor elements 105, which measurement membranes are arranged on the surface 133, are covered with the protective medium 111. Due to the mass of the protective medium 111 which covers the decoupling plate 115, the protective medium 111 thus exerts a pressure on the decoupling plate 115 and in particular on the measurement membranes 143 of the pressure sensor elements 105, which measurement membranes are arranged on the upper side 133 of the decoupling plate 115. The pressure of the protective medium 111 on the pressure sensor elements 105 can distort the pressure measurement values of the pressure sensor elements 105, via which the atmospheric pressure of the atmosphere in the surroundings of the microelectromechanical pressure sensor 100 can be measured.

For measuring the atmospheric pressure, the housing unit 101 has an opening 131. In this case, the upper side 133 of the decoupling plate 115 and the pressure sensor elements 105 installed thereon face the opening 131 of the housing unit 101. Due to the protective medium 111 which covers the pressure sensor elements 105, the pressure sensor elements 105 are protected from influences, such as contamination of the surroundings of the microelectromechanical pressure sensor 100.

As a function of the mass of the protective medium 111 which covers the upper side 133 of the decoupling plate 115 or the pressure sensor elements 105, a pressure is exerted on the pressure sensor elements 105 by the protective medium 111. The intensity of the pressure exerted on the pressure sensor elements 105 by the protective medium 111 depends not only on the mass of the protective medium 111 which covers the pressure sensor elements 105 but also on the respective position of the microelectromechanical pressure sensor 100 relative to the direction of Earth's gravity. In the representation shown, Earth's gravitational force F is oriented relative to the z-axis of the coordinate system shown. In the orientation shown, in which the effective direction D of the pressure sensor elements 105 is aligned in parallel with Earth's gravitational force F, the maximum pressure of the protective medium 111 which covers the pressure sensor elements 105 acts on the pressure sensor elements 105. With a change in the position of the microelectromechanical pressure sensor 100, for example as a result of a tilting about the x- and/or y-axes of the coordinate system shown, the pressure exerted on the pressure sensor elements 105 by the protective medium 111 which covers the pressure sensor elements 105 can be continuously reduced from the maximum pressure value to a pressure value equal to 0. In the case of tilting the microelectromechanical pressure sensor 100 from the shown position by 90° about the x- and/or y-axis, the protective medium 111 which covers the pressure sensor elements 105 does not exert any pressure on the pressure sensor elements 105.

In the position shown, as a result of the pressure P, which is exerted on the pressure sensor elements 105 or the decoupling plate 115 by the protective medium 111 and is aligned in parallel with the effective direction D of the pressure sensor elements 105 in the position shown, a deflection of the decoupling plate 115 relative to the base structure 103 takes place as a result of the deflectable mounting of the pressure sensor elements 105. In this case, the decoupling plate 115 is moved in the direction of the bottom surface 117.

As a result of the deflection of the decoupling plate 115 together with the pressure sensor elements 105 arranged thereon, the deflection correspondingly performed by the decoupling plate 115 relative to the base structure 103 can be ascertained by the deflection measuring element 107 arranged on the suspension element 113.

For this purpose, the deflection measuring element 107 can, for example, comprise a strain gauge, which, in the embodiment shown, is arranged on the suspension element 113. The strain gauge can, for example, be designed as a capacitive or a resistive strain gauge 123.

By the measurement of the strain gauge 123, the deformation of the suspension element 113 brought about by the deflection of the decoupling plate 115 can be measured in that an expansion or a compression of the strain gauge 123 takes place as a result of the deformation of the suspension element 113.

On the basis of the measurement values of the strain gauge 123, a value of the deflection of the decoupling plate 115 and of the associated deflection of the pressure sensor elements 105 relative to the base structure 103 from a neutral, non-deflected position of the decoupling plate 115 relative to the base structure 103 can thus be measured.

Knowing the mass of the protective medium 111 which covers the decoupling plate 115, and taking into account the area of the pressure sensor elements 105, the pressure P exerted on the pressure sensor elements 105 by the protective medium 111 which covers the pressure sensor elements 105 can be ascertained. For this purpose, databases in which relationships between deflection values of the decoupling plate 115 and pressure values that the protective medium 111 which covers the pressure sensor elements 105 exerts on the corresponding pressure sensor elements 105 can, for example, be stored in the computing unit 127.

After ascertaining the pressure value exerted on the pressure sensor elements 105 by the protective medium 111, a corresponding correction of the pressure measurement values of the pressure sensor elements 105 can be performed by the computing unit 127. The pressure measurement values of the pressure sensor elements 105 in this case describe a combination of the atmospheric pressure of the atmosphere of the surroundings of the microelectromechanical pressure sensor 100 and the pressure exerted on the pressure sensor elements 105 by the protective medium 111.

Alternatively, the correction of the pressure measurement values can take place via a determination of the position of the pressure sensor 100 relative to Earth's gravity. For this purpose, the respective position of the pressure sensor 100 can be determined via the deflection measurement element 107 as a result of a trimming of the pressure sensor 100 that took place previously. For this purpose, relations between different positions of the pressure sensor 100 and deflection values of the deflection measuring element 107 were previously ascertained in the trimming. Furthermore, in the trimming, correction values were determined for the respective positions of the pressure sensor 100, with which correction values the pressure measurement values of the pressure sensor elements 105 are to be corrected in order to compensate for the influences of the protective medium 111.

During operation of the pressure sensor 100, values of a respective position of the pressure sensor 100 would then be ascertained on the basis of the measured deflection value of the deflection measuring element 107 and the databases. On the basis of the thus determined position of the pressure sensor 100, the respective correction factors with which the pressure measurement values of the pressure sensor elements 105 are to be corrected could be read from the corresponding databases. The pressure exerted on the pressure sensor elements 105 by the protective medium 111 would thus not have to be determined explicitly.

The protective medium 111 can be made of a gel material, for example.

The ripple of the surface of the protective medium 111 is shown exaggerated in FIG. 1.

FIG. 2 shows a schematic plan view of the micromechanical pressure sensor 100 according to one embodiment.

FIG. 2 shows a plan view of the microelectromechanical pressure sensor 100 of FIG. 1. In FIG. 2, the housing unit 101 is not shown. FIG. 2 shows the rectangular design of the base structure 103 and of the decoupling plate 115 arranged within the base structure 103. The two pressure sensor elements 105 are arranged next to one another on the decoupling plate 115, in particular on the upper side 133. The decoupling plate 115 is connected to one of the side elements 121 of the base structure 103 via the suspension element 113. For this purpose, the suspension element 113 is formed on a side region 139 of the decoupling plate 115.

According to one embodiment, the decoupling plate 115 is integrally connected to the wall element 121 of the base structure 103 via the suspension element 113.

It is also shown that the decoupling plate 115 is connected to the base structure 103 exclusively via the suspension element 113. Apart from the connection via the suspension element 113, a further intermediate space 129 is formed between the wall elements 121 and the decoupling plate 115.

In the representation shown, the deflection measuring element 107 is designed as a strain gauge 123 arranged on the suspension element 113. The strain gauge 123 is connected to the wall element 121 and the computing unit 127 with two bonding connections 137.

The computing unit 127 can, for example, be designed as an ASIC.

Since the decoupling plate 115 is connected to the base structure 103 exclusively via the suspension element 113 and the intermediate space 129 is formed between the decoupling plate 115 and the wall elements 121, the decoupling plate 115 is largely decoupled from vibrations or stress-induced deformations of the base structure 103. This enables the most precise possible pressure measurement by the pressure sensor elements 105.

For this purpose, the pressure sensor elements 105 can, for example, be designed as capacitive pressure sensor elements 105 and can comprise corresponding measurement membranes which are formed on the upper side 133 of the decoupling plate 115.

The decoupling plate 115 can be integrally connected to the base structure 103 via the suspension element 113. For this purpose, the suspension element 113 can be designed as a spring element.

The shape of the microelectromechanical pressure sensor 100 shown, in particular of the decoupling plate 115 or of the pressure sensor elements 105, and also the number of the pressure sensor elements 105 formed are shown in FIGS. 1 and 2 merely by way of example and are not intended to limit the present invention.

FIG. 3 shows a flowchart of a method 200 for correcting pressure measurement values of a micromechanical pressure sensor 100 according to one embodiment.

In a first method step 201, pressure measurement values of the pressure sensor elements 105 are recorded first. The pressure measurement values in this case comprise a combination of the atmospheric pressure of the surroundings of the microelectromechanical pressure sensor 100 and the pressure exerted on the pressure sensor elements 105 by the protective medium 111 which covers the pressure sensor elements 105.

In a further method step 203, deflection values of a deflection of the pressure sensor elements 105 relative to the base structure 103 are recorded by the deflection measuring element 107. The deflection in this case describes a deflection from a neutral position in which no pressure-induced deflection of the pressure sensor elements 105 relative to the base structure 103 takes place.

In a further method step 205, a pressure value is ascertained on the basis of the deflection values of the pressure sensor elements 105, which pressure value is exerted on the pressure sensor elements 105 by the protective medium 111 which covers the pressure sensor elements 105.

The pressure value can in this case be ascertained indirectly. For this purpose, corresponding positions of the pressure sensor 100 relative to Earth's gravitational force F can be ascertained on the basis of the deflection values of the deflection measuring element 107. On the basis of the respectively ascertained position of the pressure sensor 100, it is possible to ascertain corresponding correction factors by which the pressure measurement values of the pressure sensor elements 105 are to be corrected in order to correct the influences of the protective medium 111 on the pressure sensor elements 105. In order to ascertain the position and the correction factors, corresponding databases can be used, in which corresponding relationships between deflection and position and between position and correction factor are stored, wherein the respective relationships were determined by corresponding measurements during a trimming of the pressure sensor 100. In this case, the pressure exerted on the pressure sensor elements 105 by the protective medium 111 is indirectly contained in the correction factors.

In a further method step 207, the pressure measurement values of the pressure sensor elements 105 are corrected with respect to the ascertained pressure value exerted on the pressure sensor elements 105 by the protective medium 111.

In a further method step 209, a pressure measurement value corrected correspondingly with respect to the pressure exerted on the pressure sensor elements 105 by the protective medium 111 is output.

FIG. 4 shows a schematic representation of a computer program product 300 comprising instructions that, when the program is executed by a data processing unit, cause the latter to perform the method 200 for correcting pressure measurement values of a micromechanical pressure sensor 100.

In the embodiment shown, the computer program product 300 is stored on a storage medium 301. The storage medium 301 can be any storage medium from the related art.

What is claimed is:

1. A microelectromechanical pressure sensor, comprising:
a housing unit;
a base structure;
a pressure sensor element; and
a deflection measuring element;
wherein the housing unit defines a receiving space, wherein the base structure, the pressure sensor element, and the deflection measuring element are arranged in the receiving space, wherein the receiving space is filled with a protective medium which covers the pressure sensor element, wherein the pressure sensor element is arranged so as to be deflectable relative to the base structure, and wherein the deflection measuring element is configured to determine a relative deflection of the pressure sensor element relative to the base structure.

2. The pressure sensor according to claim 1, wherein the pressure sensor element is resiliently connected to the base structure via a suspension element.

3. The pressure sensor according to claim 2, wherein the pressure sensor element is arranged on a decoupling plate.

4. The pressure sensor according to claim 3, wherein the decoupling plate is aligned in parallel with a bottom surface of the base structure and is spaced apart from the bottom surface.

5. The pressure sensor according to claim 4, wherein an intermediate space between the decoupling plate and the bottom surface is filled with the protective medium.

6. The pressure sensor according to claim 3, wherein the decoupling plate is resiliently integrally connected to a wall element of the base structure via the suspension element.

7. The pressure sensor according to claim 2, wherein the deflection measuring element includes at least one strain gauge which is formed on the suspension element.

8. The pressure sensor according to claim 7, wherein the strain gauge is a capacitive strain gauge.

9. The pressure sensor according to claim 7, wherein the strain gauge is a resistive strain gauge.

10. The pressure sensor according to claim 1, wherein the protective medium is made of a gel material.

11. The pressure sensor according to claim 1, wherein the pressure sensor element is a capacitive pressure sensor element.

12. A method for correcting pressure measurement values of a microelectromechanical pressure sensor, the pressure sensor including:
a housing unit, a base structure,
a pressure sensor element, and
a deflection measuring element,
wherein the housing unit defines a receiving space, wherein the base structure, the pressure sensor element, and the deflection measuring element are arranged in the receiving space, wherein the receiving space is filled with a protective medium which covers the pressure sensor element, wherein the pressure sensor element is arranged so as to be deflectable relative to the base structure, and wherein the deflection measuring element is configured to determine a relative deflection of the pressure sensor element relative to the base structure,
wherein the method comprises the following steps:
recording at least one pressure measurement value of the pressure sensor element;
recording at least one deflection value of the deflection measuring element, wherein the deflection value describes a deflection of the pressure sensor element relative to the base structure;
ascertaining, based on the deflection value, a pressure value which acts on the pressure sensor element as a result of the protective medium;
correcting the pressure measurement value measured by the pressure sensor element using the ascertained pressure value which acts on the pressure sensor element as a result of the protective medium; and
outputting a corrected pressure measurement value.

13. A computing unit which is configured to correct pressure measurement values of a microelectromechanical pressure sensor, the pressure sensor including:
a housing unit,
a base structure,
a pressure sensor element, and
a deflection measuring element,
wherein the housing unit defines a receiving space, wherein the base structure, the pressure sensor element, and the deflection measuring element are arranged in the receiving space, wherein the receiving space is filled with a protective medium which covers the pressure sensor element, wherein the pressure sensor element is arranged so as to be deflectable relative to the base structure, and wherein the deflection measuring element is configured to determine a relative deflection of the pressure sensor element relative to the base structure,
wherein the computing unit is configured to:
record at least one pressure measurement value of the pressure sensor element;
record at least one deflection value of the deflection measuring element, wherein the deflection value describes a deflection of the pressure sensor element relative to the base structure;
ascertain, based on the deflection value, a pressure value which acts on the pressure sensor element as a result of the protective medium;
correct the pressure measurement value measured by the pressure sensor element using the ascertained pressure value which acts on the pressure sensor element as a result of the protective medium; and
output a corrected pressure measurement value.

14. A non-transitory computer-readable medium on which is stored a computer program including instructions for correcting pressure measurement values of a microelectromechanical pressure sensor, the pressure sensor including:
a housing unit, a base structure, a pressure sensor element, and a deflection measuring element, wherein the housing unit defines a receiving space, wherein the base structure, the pressure sensor element, and the deflection measuring element are arranged in the receiving space, wherein the receiving space is filled with a protective medium which covers the pressure sensor element, wherein the pressure sensor element is arranged so as to be deflectable relative to the base structure, and wherein the deflection measuring element is configured to determine a relative deflection of the pressure sensor element relative to the base structure, wherein the instructions, when executed by a computer, causing the computer to perform the following steps:

recording at least one pressure measurement value of the pressure sensor element;

recording at least one deflection value of the deflection measuring element, wherein the deflection value describes a deflection of the pressure sensor element relative to the base structure;

ascertaining, based on the deflection value, a pressure value which acts on the pressure sensor element as a result of the protective medium;

correcting the pressure measurement value measured by the pressure sensor element using the ascertained pressure value which acts on the pressure sensor element as a result of the protective medium; and outputting a corrected pressure measurement value.

\* \* \* \* \*